June 5, 1934.  W. THORNER  1,961,309
OPHTHALMOSCOPE
Filed May 19, 1931
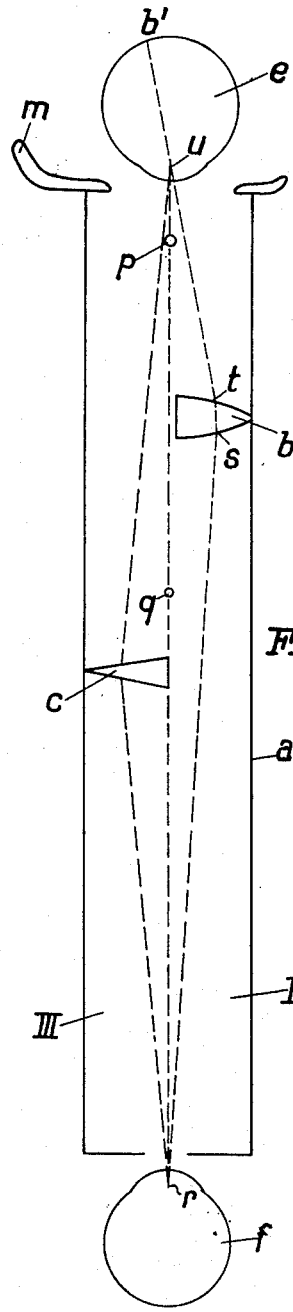
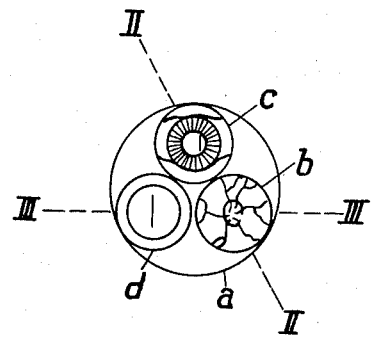
Fig.1
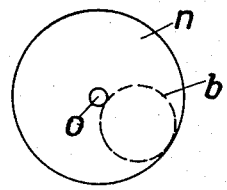
Fig.4
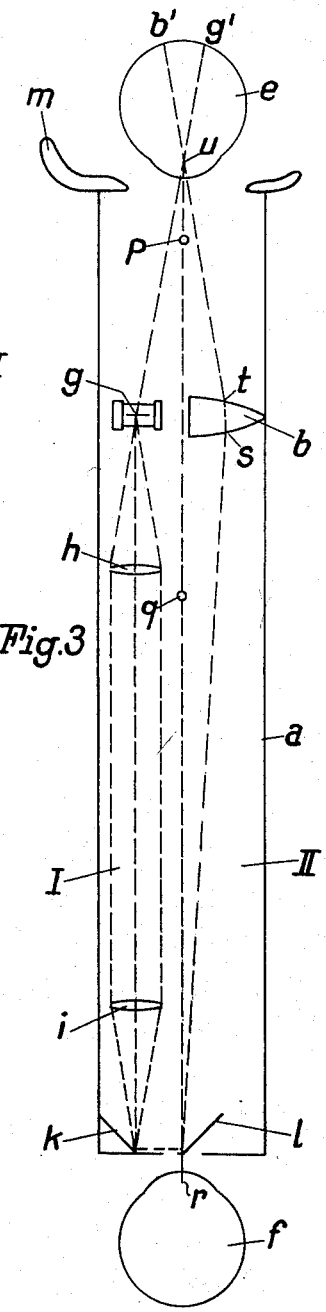
Inventor:
Walther Thorner,
By Byrnes, Townsend & Potter
Attorneys.

Patented June 5, 1934

1,961,309

UNITED STATES PATENT OFFICE 1,961,309

OPHTHALMOSCOPE

Walther Thorner, Berlin, Germany

Application May 19, 1931, Serial No. 538,543
In Germany May 23, 1930

6 Claims. (Cl. 88—20)

The present invention relates to ophthalmoscopes, and has for its object to generally improve on instruments of this description.

In ophthalmoscopes which overcome the cornea reflection by the use of a convex lens system, which serves commonly for illumination and observation, and produces in the pupil of the person being examined true images of the inlet apertures of the illumination and observation system disposed separately side by side, difficulties are encountered in the form of middle reflections resulting on the front and rear sides of the convex lens.

These difficulties may be avoided if the centres of curvature of the surface of the convex lens are, in accordance with the invention, disposed to such extent outside of the visual ray of the image centre that reflection at the centre of the image does not take place.

For this purpose there is employed an eccentrically disposed portion taken from a convex lens of relatively large size for the simultaneous illumination and observation of the back of the eye, while the space thus made available in the tubular casing of the instrument is utilized for projection of the finder image which is presented to the observer by the pupil of the examined eye so that he is able to control the position of the source of light, and for accommodation of the illuminating system of the ophthalmoscope, insofar as the same does not belong to the common observing and illuminating system, viz., the lamp with its condensers.

The three parts of the ophthalmoscope, to wit, the passage for the rays in respect of the image proper, the finder passage and the lamp with its condensers, are preferably linked up in the form of an approximately equilateral triangle, so that the same may be surrounded by a relatively thin common tube.

The field of view is certainly diminished by the use of the eccentric lens portion, but insofar as a hand instrument is concerned, which is intended for use with a narrow pupil, a relatively large field of view is in any case not desired, as this would lead to excessive contraction of the pupil. For this reason the invention serves to replace in the case of hand ophthalmoscopes the more complicated use heretofore usual of systems comprising merely reflectors.

A form of embodiment according to the invention is shown sectionally in diagrammatical form in the accompanying drawing, in which Fig. 1 is a section vertical to the axis of the tube, Fig. 2 is a section along the line II—II of Fig. 1, and Fig. 3 a section along the line III—III of Fig. 1, while Fig. 4 shows diagrammatically a detail.

The interior of the tubular casing $a$ may be considered as including three tubular spaces I, II and III, whose limits are indicated in Fig. 1, by the three substantially contacting circles, $b$, $c$, $d$, respectively. The spaces constitute independent paths to which different beams of light are confined by the lens systems and, if desired, tubular elements (not shown) may be arranged within the casing $a$ to prevent all inadvertent refraction or reflection from one space into another. The space I is occupied by the lamp and its associated condensers, the space II is traversed by light beams of both the illuminating and observing systems, and the space III is occupied by the finder. $b$ is the periphery of the eccentric convex lens, which conducts the light to the back of the eye $e$ and back again to the observer $f$. $b'$ is the centre of the observed portion of the back of the eye, and $c$ is a round prism having the base towards the inside, which prism causes the pupil $u$ of the examined eye $e$ to be visible to the observer $f$. $d$ is a tube which encases the source of light, a small filament lamp $g$ with the condensing lenses $h$ and $i$.

The light of the lamp $g$ is concentrated by lenses $h$ and $i$ on the small mirrors $k$ and $l$ the latter of which reflects the rays impinging thereon towards lens $b$. When the instrument is in use the patient is instructed to adjust his eye so as to get a sharp image of the lamp which is formed at $g'$ in the middle part of the retina. Of course the section $b$ of a convex lens formed by a single piece of glass illustrated on the drawing is only a diagrammatic representation of an optical lens structure fulfilling the requirement stated in the introductory part of this specification according to which the centers of curvature of said lens structure are disposed at a suitable distance from the visual ray of the image center.

According to the prior practice, the convex lens employed to direct light rays from reflector $l$ to the back of the eyes has been of circular outline and has extended across substantially the entire transverse section of the casing $a$, as is indicated by the circle $n$ in the diagrammatic view, Fig. 4. According to this invention, the convex lens $b$ has its centers of curvature at points $p$ and $q$, as in the prior practice, but the lens $b$ is only a small, eccentrically located portion of the convex lenses previously employed, and it is so positioned within casing *a* that it does not extend across the direct path, indicated by small circle *o* in Fig. 4, of light rays from the patient's eye *e* to the observer's eye *f*. This construction completely eliminates the disturbing reflection of light from the central portion of the old forms of convex lenses of circular outline.

The customary support or stop *m* for the eye of the patient is carried by the tubular casing *a* of the instrument.

What I claim as new and desire to secure by Letters Patent is:

1. An ophthalmoscope, comprising a tubular casing provided at one end with a narrow opening, an illuminating system for directing rays of light upon a reflector adjacent the said end and adapted to reflect rays of light impinging thereon towards the opposite end of said casing, a prismatic biconvex lens within said casing eccentrically positioned in relation thereto, said lens having a cross-section smaller than that of said casing and being constructed and disposed so as to direct the rays proceeding from said reflector substantially towards the middle of the said opposite end of the casing, and the centres of curvature of both lens surfaces being positioned at a substantial distance from the central beam passing through said lens.

2. An ophthalmoscope according to claim 1, the said biconvex lens consisting of an eccentric portion of a normal biconvex lens, the centres of curvature of the two surfaces of the said lens being positioned substantially on the central axis of the said tubular casing.

3. An ophthalmoscope according to claim 1, wherein the said illuminating system comprises a source of light, a lens system for concentrating the light emitted thereby, and a second reflector at the same end of the said casing as said first reflector, the said second reflector being adapted to transmit the concentrated light to the said first reflector, all the said elements of the illuminating system being positioned within the said tubular casing eccentrically thereto.

4. An ophthalmoscope as claimed in claim 1, in combination with a finder consisting of a refracting prism, said illuminating system and said finder being each located within said tubular casing and eccentrically thereof in portions thereof lying outside of the portion of said casing occupied by said prismatic biconvex lens.

5. An ophthalmoscope comprising a tubular casing having one open end adapted to be positioned adjacent the eye of a patient and having its opposite end provided with a narrow observer's opening, a reflector adjacent said observer's opening for reflecting light rays impinging thereon towards the said open end of the casing, and a pair of optical systems within said casing for directing towards said first end of the casing a light beam reflected from said reflector and for permitting observation from said observer's opening of an eye illuminated by the said light beam, the said optical systems each including lens means and the said lens means being positioned out of axial alinement to pass beams of light rays which traverse noncoincident portions of the space within said casing, and the lens means of the optical system for directing said light beam towards said first end of the casing including curved surfaces whose centers of curvature are located outside the center of the beam of rays passed by that optical system.

6. An ophthalmoscope comprising a tubular casing having one open end and having a narrow observation opening at its opposite end, an optical system within said casing constituting means by which a view of an eye positioned at said open end may be had from the observation opening at the opposite end, and means within said casing for producing an image on an eye positioned adjacent said open end of the casing; said means comprising reflector means adjacent said observation opening for reflecting a beam of light towards the said open end of the casing, and lens means positioned outside the path of the beam of light rays of said optical system for directing a beam of light rays from said reflector towards the center of the said open end of the casing, said lens means having a plurality of curved exterior surfaces whose centers of curvature are located outside of the center of the beam of light traversing said lens means.

WALTHER THORNER.